(12) United States Patent
Rist

(10) Patent No.: US 10,434,561 B2
(45) Date of Patent: Oct. 8, 2019

(54) METHOD FOR CONNECTING A PIPE, FOR LIQUID OR GASEOUS MEDIA, WITH A PLUG CONNECTOR

(71) Applicant: Henn GmbH & Co KG., Dornbirn (AT)

(72) Inventor: Marvin Rist, Kennelbach (AT)

(73) Assignee: Henn GmbH & Co KG., Dornbirn (AT)

( * ) Notice: Subject to any disclaimer, the term of this patent is extended or adjusted under 35 U.S.C. 154(b) by 128 days.

(21) Appl. No.: 15/571,539

(22) PCT Filed: Apr. 29, 2016

(86) PCT No.: PCT/AT2016/050118
§ 371 (c)(1),
(2) Date: Nov. 3, 2017

(87) PCT Pub. No.: WO2016/176704
PCT Pub. Date: Nov. 10, 2016

(65) Prior Publication Data
US 2018/0126441 A1 May 10, 2018

(30) Foreign Application Priority Data
May 6, 2015 (AT) .................................. 50371/2015

(51) Int. Cl.
*F02M 35/10* (2006.01)
*B21D 39/04* (2006.01)
*F16L 47/06* (2006.01)

(52) U.S. Cl.
CPC ..... *B21D 39/046* (2013.01); *F02M 35/10144* (2013.01); *F02M 35/10209* (2013.01); *F16L 47/06* (2013.01)

(58) Field of Classification Search
CPC ........... B21D 39/046; F02M 35/10144; F02M 35/10209; F16L 47/06; B30B 15/18; B30B 15/26; B30B 15/22; B30B 14/15
(Continued)

(56) References Cited

U.S. PATENT DOCUMENTS

| 6,526,642 B2 | 3/2003 | Sausner |
| 6,711,799 B1 | 3/2004 | Hasselbring |

(Continued)

FOREIGN PATENT DOCUMENTS

| AT | 509 196 A4 | 7/2011 |
| DE | 199 35 402 A1 | 2/2001 |

(Continued)

OTHER PUBLICATIONS

International Search Report of PCT/AT2016/050118, dated Sep. 9, 2016.

*Primary Examiner* — Ryan J. Walters
*Assistant Examiner* — Lawrence Averick
(74) *Attorney, Agent, or Firm* — Collard & Roe, P.C.

(57) ABSTRACT

The invention relates to a method for connecting a pipe (3) for liquid or gaseous media with a plug connector (4), wherein a first casing section (12) of the plug connector (4) is deformed by means of a pressing tool in such a way that a pipe (3) positioned between the first casing section (12) and a second casing section (15) of the plug connector (4) is clamped. During the pressing process, the pressing force applied to the pressing tool is detected and a pressing force increase per unit of path length is calculated from the travel of the pressing tool and the pressing force. The detected pressing force increase per unit of path length is compared to a minimum required pressing force increase per unit of path length, and in the event, that the determined minimum (Continued)

required pressing force increase per unit of path length is not met, the plug connector (4) is identified as faulty.

7 Claims, 7 Drawing Sheets

(58) Field of Classification Search
USPC .... 29/787, 402.02, 712, 721, 795; 264/40.1, 264/272.11, 320; 425/393
See application file for complete search history.

(56) References Cited

U.S. PATENT DOCUMENTS

| | | | |
|---|---|---|---|
| 6,802,112 | B2 | 10/2004 | Wode |
| 7,975,373 | B2 * | 7/2011 | Hartmann ............ B21D 39/046 |
| | | | 29/787 |
| 8,997,328 | B2 * | 4/2015 | Hartmann ............ F16L 13/147 |
| | | | 29/426.5 |
| 2007/0057393 | A1 * | 3/2007 | Hartmann ............ B21D 39/046 |
| | | | 264/40.1 |
| 2013/0009393 | A1 * | 1/2013 | Hartmann ............ F16L 13/147 |
| | | | 285/45 |

FOREIGN PATENT DOCUMENTS

| | | |
|---|---|---|
| DE | 199 60 652 C1 | 3/2001 |
| DE | 100 56 571 C1 | 7/2002 |
| DE | 10 2013 219159 B3 | 11/2014 |
| EP | 1 208 936 A1 | 5/2002 |
| EP | 1 762 312 A1 | 3/2007 |
| EP | 2 364 791 B1 | 9/2011 |
| EP | 2 586 542 A1 | 5/2013 |

* cited by examiner

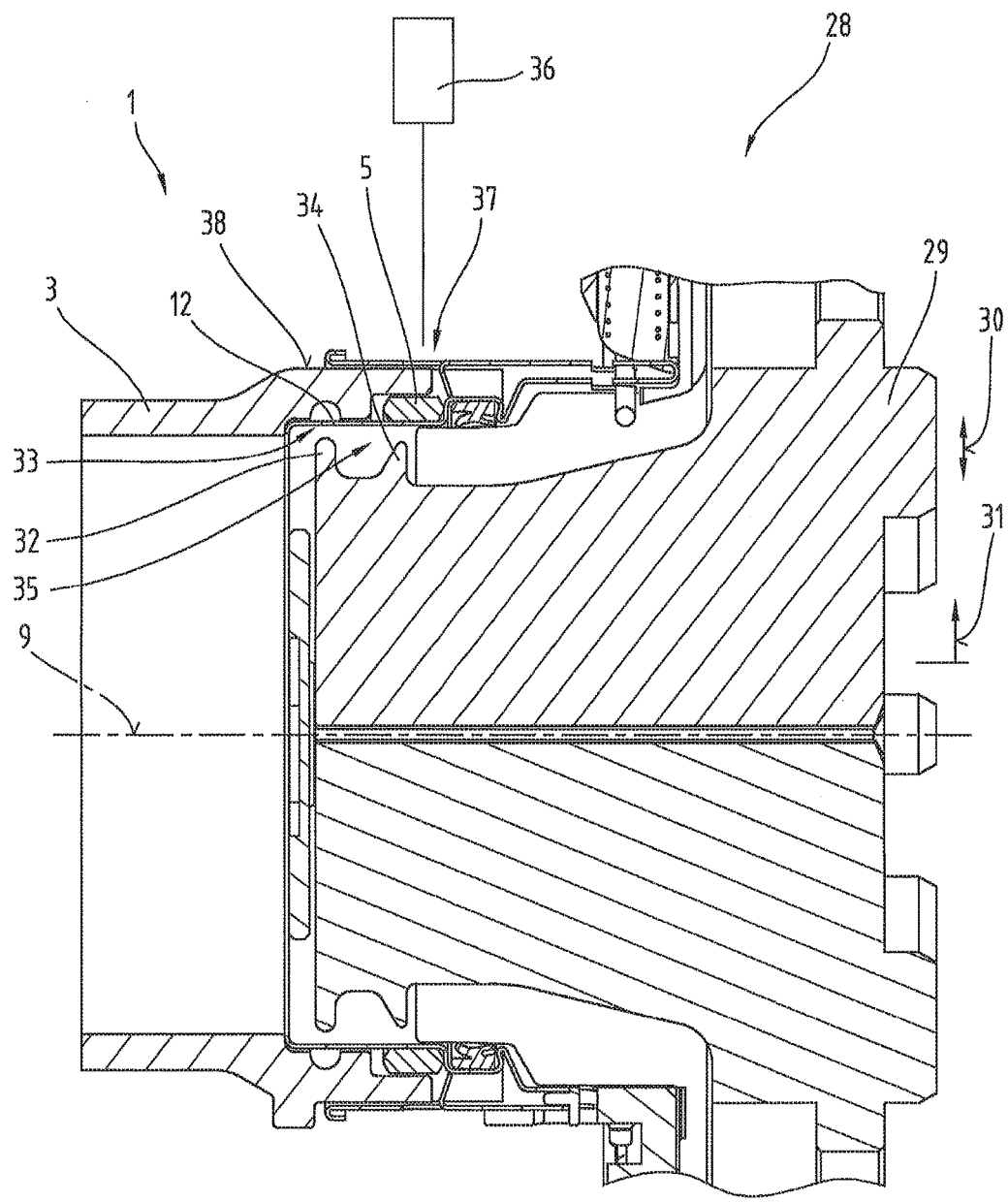

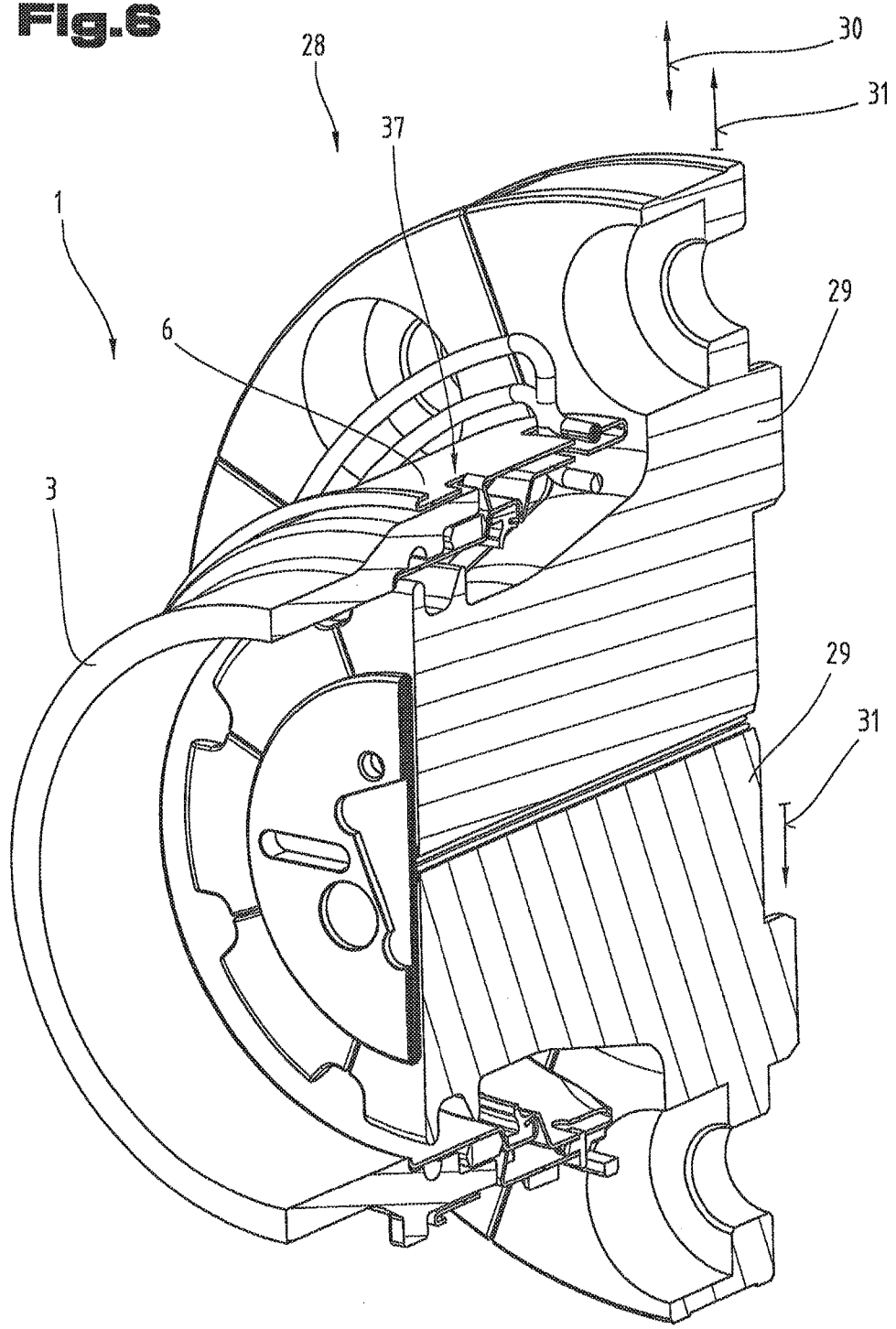

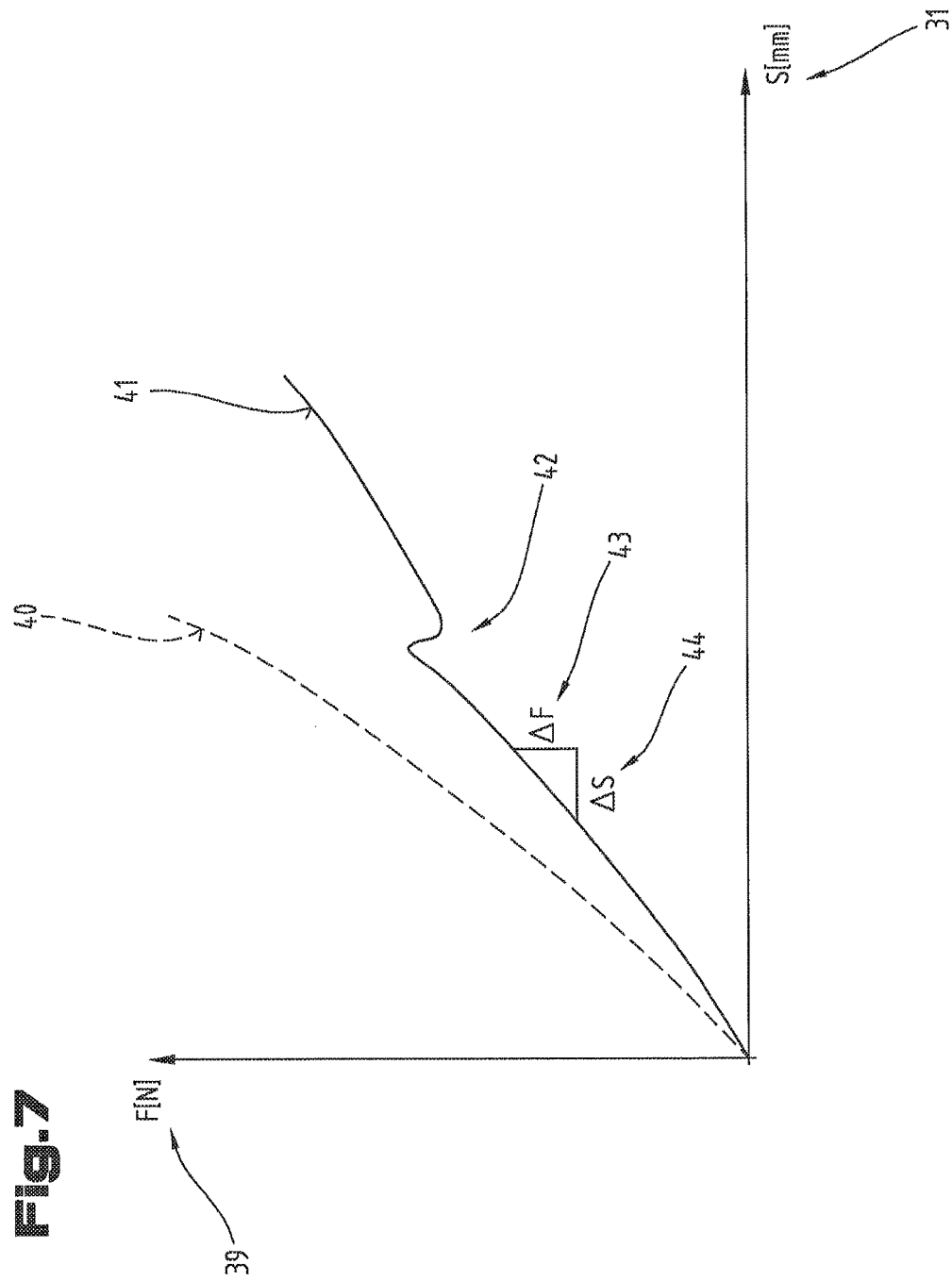

METHOD FOR CONNECTING A PIPE, FOR LIQUID OR GASEOUS MEDIA, WITH A PLUG CONNECTOR

CROSS REFERENCE TO RELATED APPLICATIONS

This application is the National Stage of PCT/AT2016/050118 filed on Apr. 29, 2016, which claims priority under 35 U.S.C. § 119 of Austrian Application No. A 50371/2015 filed on May 6, 2015, the disclosure of which is incorporated by reference. The international application under PCT article 21(2) was not published in English.

The invention relates to a method for connecting a pipe for liquid or gaseous with a plug connector.

The pressing action of a plug connector with an end section of a conduit is described in EP 1 762 312 A1, in which the pressing force is set to different values according to the path, also referred to as path-dependent force control. The end section of the conduit is inserted into an annular chamber between the inner sleeve-like first wall section and the outer sleeve-like second wall section, on which by means of a spreading tool the first wall section is pushed from the inside in the direction of the outer wall section against the end section of the conduit inserted in the annular chamber between the two wall sections. In this way an annular pressing groove is formed in the first wall section. In order to ensure that a sufficient degree of pressing or sufficient pressing is achieved the pressing force is monitored, whereby a nominal value of the pressing force and the actually applied pressing force is compared with said nominal value.

From EP 2 364 791 B1 a further method and device for pressing a conduit are known.

In the devices and/or methods known from EP 1 762 312 A1 and EP 2 364 791 B1 it is only partially possible to determine a potential break in the workpiece or tool to be pressed.

The underlying objective of the present invention is to provide a pressing method in which it is possible to identify a possible break in the workpiece occurring during the pressing process, in particular of the plug connector or the tool.

Said objective of the invention is achieved by the method according to claim 1.

According to the invention for connecting a pipe for liquid or gaseous media to a plug connector a first casing section of the plug connector is deformed by means of a pressing tool so that a pipe lying between the first casing section and second casing section of the plug connector is clamped. Furthermore, during the pressing process the pressing force applied to the pressing tool is detected and a pressing force increase per unit of path length is calculated from the travel of the pressing tool and the pressing force. Furthermore, the detected pressing force increase per unit of path length is compared with a minimum required pressing force increase per unit of path length and in the event, that the determined minimum required pressing force increase per unit of path length is not met, the plug connector is identified as faulty.

The advantage of this method is that the breakage of the plug connector during the pressing process can be determined and suitable action can be taken so that said reject part is not installed into a vehicle. In particular, by means of the method according to the invention it is possible to detect a break in the workpiece regardless of the dimensions of the plug connector and also regardless of the maintenance of manufacturing tolerances in the plug connector.

Furthermore, it is possible that an incremental value for a unit of path length is set to be between one ten-thousandth of a millimeter and one tenth of a millimeter, in particular a thousandth of a millimeter. It is an advantage here that the scaling is set to be fine enough that it is possible to detect possible tool breakage with sufficient reliability.

Furthermore, it can be an advantage if an acoustic and/or visual signal is used to indicate to a machine operator that a plug connector is faulty. It is an advantage here that the machine operator can thus reject the plug connector identified as faulty so that the latter is removed from the production process.

Alternatively, a plug connector identified as faulty is removed in an automated process. It is an advantage that in an automated production process, in which individual method steps are not performed directly by a machine operator, the faulty plug connector is removed automatically.

Furthermore, it is possible for the pressing force increase per unit of path length to be recorded and represented graphically. It is an advantage here that it is possible identify specific characteristics of breakage behavior from the recording and graphic representation of the pressing force progression of damaged plug connectors.

Furthermore, it is possible that the minimum required pressing force increase per unit of path length is set to be greater than zero Newton per unit of path length. It is an advantage here that at this level it can be assumed that the plug connector has broken with a high degree of probability.

Furthermore, it is possible to identify the plug connector as faulty if the pressing force increase per unit of path length over several units of path length falls below the minimum required pressing force increase. It is an advantage here that in this way a so-called pull-out value can be excluded and thus the quality of the control can be improved. In this way, less waste is produced.

The term "pipe" is used broadly in the present invention. It includes not only an elastomer hose but also a pipe which has a rigid form. It can thus also include plastic pipes.

For a better understanding of the invention the latter is explained in more detail with reference to the following Figures.

In a much simplified, schematic representation:

FIG. 5 shows a cross-sectional view of the plug assembly with pressing tool;

FIG. 6 shows a perspective view of the plug assembly with pressing tool;

FIG. 7 shows a schematic view of the force progression during a pressing process.

Figure 1:
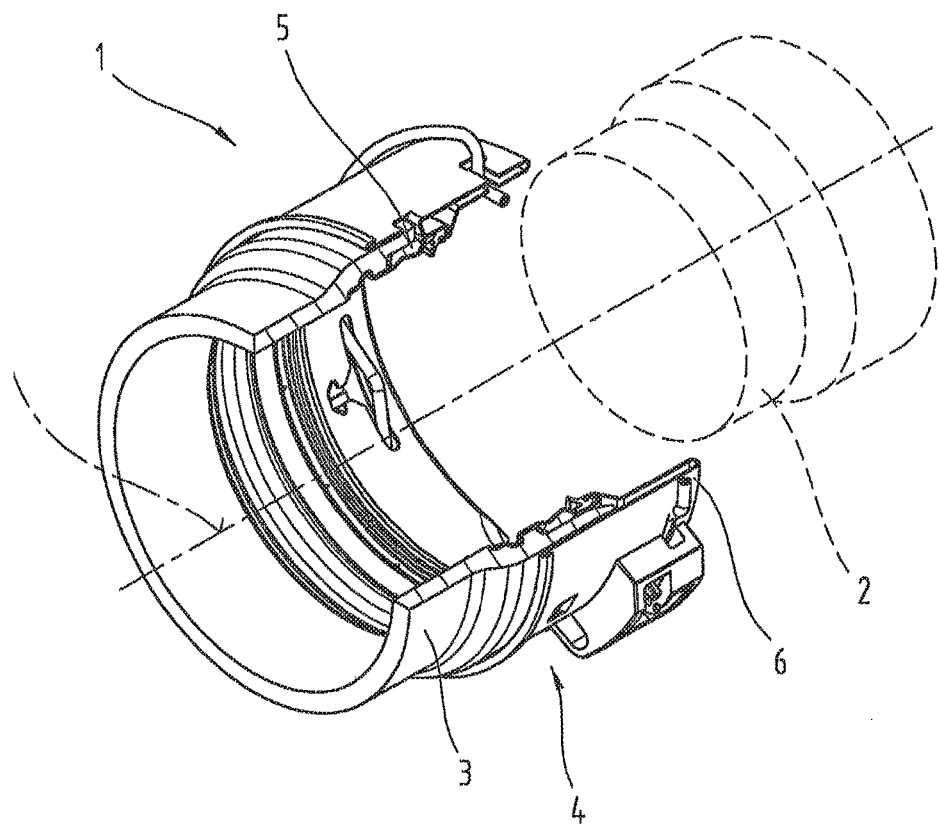
FIG. 1 shows a perspective view of a plug assembly in a quarter section.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

FIG. 1 shows a perspective view of a plug assembly 1, wherein the latter is shown in a quarter section. Furthermore, in FIG. 1 a mating connector 2 is shown schematically which can be connected to the plug assembly 1. The interaction between the plug assembly 1 and mating connector 2 is described in sufficient detail in AT 509 196 B1.

FIG. 1 shows the plug assembly 1 in an assembled state. The plug assembly 1 comprises a conduit, also referred to as a pipe 3, which can be formed by a more or less flexible hose or by an essentially rigid pipe element and is used for guiding liquid or gaseous media.

Furthermore, the plug assembly 1 comprises a plug connector 4 and possibly a sealing element 5 inserted between the plug connector 4 and pipe 3. The sealing element 5 is necessary in particular if the pipe 3 is made from a hard plastic which can only be deformed slightly.

The plug connector 4 comprises a connector body 6, which can preferably be designed as a one-piece formed part, such as a deep-drawn part, in particular made from stainless steel sheet.

Figure 2:
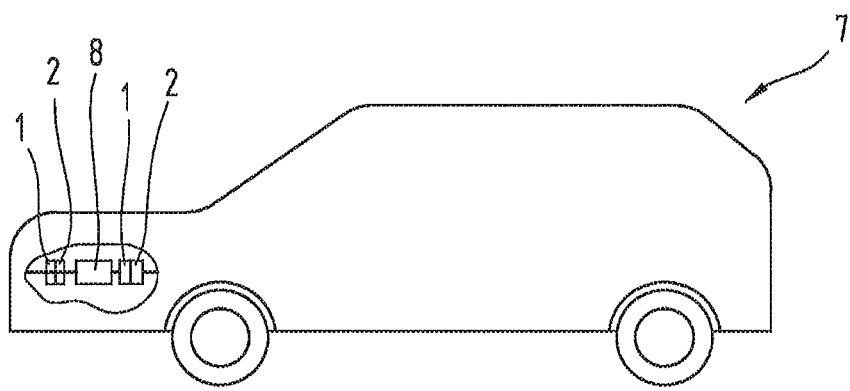
FIG. 2 shows a vehicle fitted with the plug assembly.

FIG. 2 shows a schematic representation of a vehicle 7 with an installed plug assembly 1 according to FIG. 1. As shown in FIG. 2, the plug assembly 1 is preferably inserted into a vehicle 7, in particular into a road-bound vehicle with a combustion engine. In particular, the plug assembly 1 is used for connecting different components of the fresh air supply to the combustion engine. For example, it is possible that the plug assembly 1 is provided with the corresponding mating connector 2 for connecting two parts in the suction area of a turbocharger 8. Furthermore, it is also possible for such a plug connection to be used in the pressure side coming from the turbocharger 8 for connecting two components.

Figure 3:
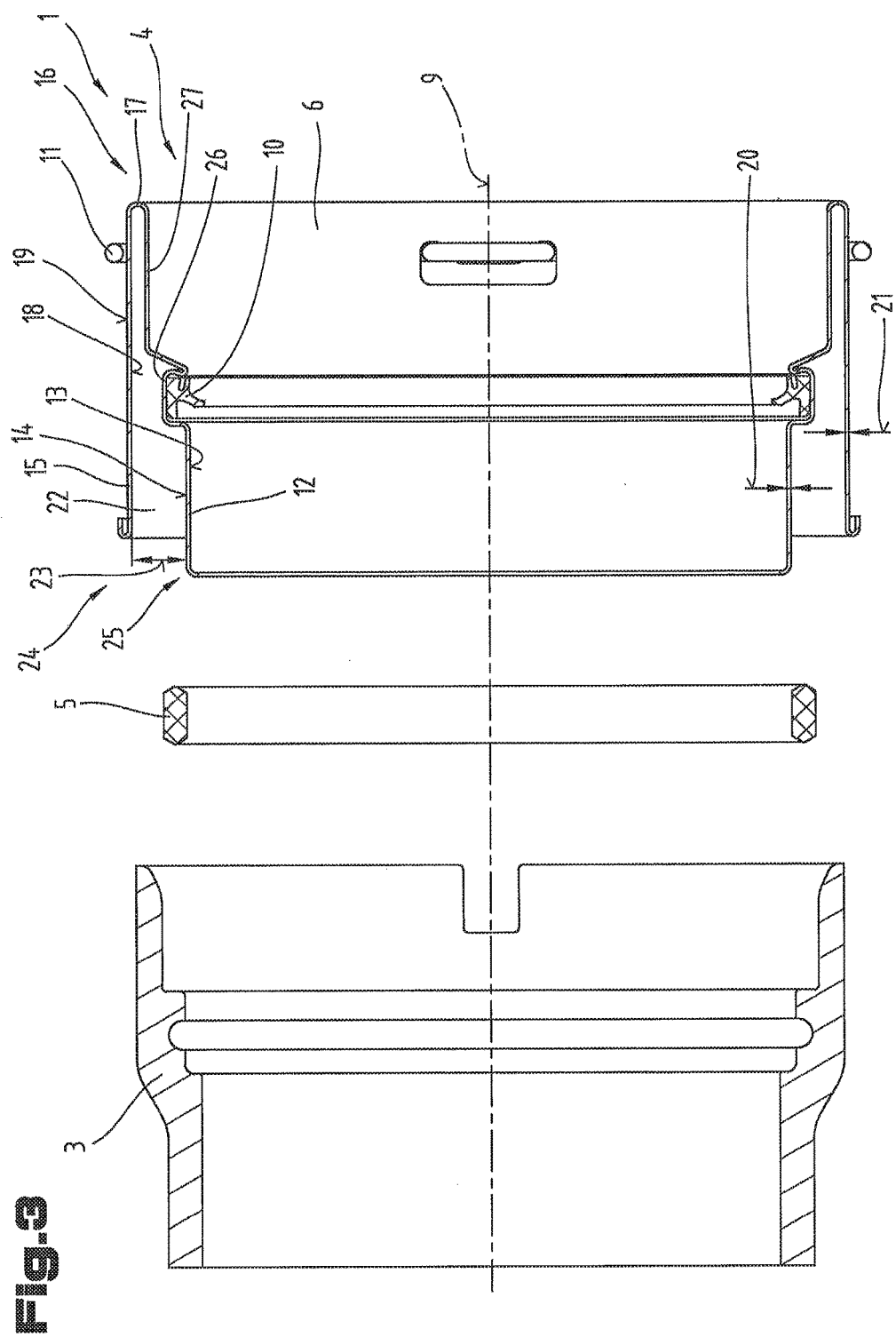
FIG. 3 shows a cross-sectional view of a first embodiment of the plug assembly in exploded view.

FIG. 3 shows a cross-section of a first embodiment of the plug assembly 1 along a central longitudinal axis 9 of the plug connector 4. In this embodiment the pipe 3 is designed as a rigid pipe, which cannot be deformed or can only be deformed slightly. With such a rigid pipe it may be necessary for the sealing element 5 to be installed. In order to describe the individual components effectively the latter are shown in an exploded view in FIG. 3.

As shown clearly in FIG. 3, it is possible that the plug connector 4 comprises a plug seal 10 next to the connector body 6, which plug seal is mounted in the connector body 6. The plug seal 10 is used to seal the plug assembly 1 sufficiently to a mating connector 2 in the assembled state.

Furthermore, the plug connector 4 can comprise a spring element 11, by means of which the plug assembly 1 can be secured in position relative to the mating connector 2 fitted to the plug assembly 1. The spring element 11 is constructed so that it can be activated and deactivated easily, so that if necessary the plug assembly 1 and the mating connector 2 can be separated from one another or joined together.

As shown in FIG. 3, a first casing section 12 is formed on the connector body 6, which casing section surrounds the central longitudinal axis 9 of the plug connector 4 in the shape of a sleeve. In other words, the first casing section 12 is a rotationally symmetrical hollow cylinder.

The first casing section 12 comprises an inner casing surface 13 and an outer casing surface 14. The first casing section 12 is surrounded by a second casing section 15, which is also designed to be rotationally symmetrical to the central longitudinal axis 9. The first casing section 12 is connected to the second casing section 15 at a first end section 16 by means of a first end face section 17.

Like the first casing section 12, the second casing section 15 also has an inner casing surface 18 and an outer casing surface 19.

The first casing section 12 is delimited by its inner casing surface 13 and the outer casing surface 14, whereby a wall thickness 20 of the first casing section 12 is formed. The second casing section 15 is also delimited by an inner casing surface 18 and an outer casing surface 19, whereby a wall thickness 21 of the second casing section 15 is formed.

An annular chamber 22 is formed from the spacing of the two casing sections 12, 15 from one another. The annular chamber 22 is delimited in particular in radial direction by the outer casing surface 14 of the first casing section 12 and by the inner casing surface 18 of the second casing section 15. In particular, an annular chamber gap 23 is formed in this way. Said annular chamber gap 23 is preferably selected so that the pipe 3 can be mounted at least partly in the latter. In the shown embodiment the annular chamber gap 23 is between 2 mm and 20 mm, in particular, between 3 mm and 10 mm, preferably between 5 mm and 7 mm.

The two casing sections 12, 15 are open to one another at a second end section 24 of the plug connector 4, whereby a pipe receiving side 25 of the connector body 6 is formed.

Furthermore, it is possible that a seal mount 26, as viewed in the direction of the first end section 16 of the plug connector 4, adjoins the first casing section 12, which is also formed in the connector body 6. A plug seal 10 can be mounted in such a seal mount 26. Furthermore, it is possible that a third casing section 27 adjoins the sealing mount 26, which is used for mounting the mating connector 2. The end face section 17 can adjoin the third casing section 27 which connects the third casing section 27 to the second casing section 15. By means of this structure or relationship, as already mentioned, the first casing section 12 is connected via the end face section 17 to the second casing section 15.

Preferably, the connector body 6 is produced by means of a deep-drawing method, in which all of the wall thicknesses of the casing sections of the connector body 6 are approximately the same size.

Figure 4:
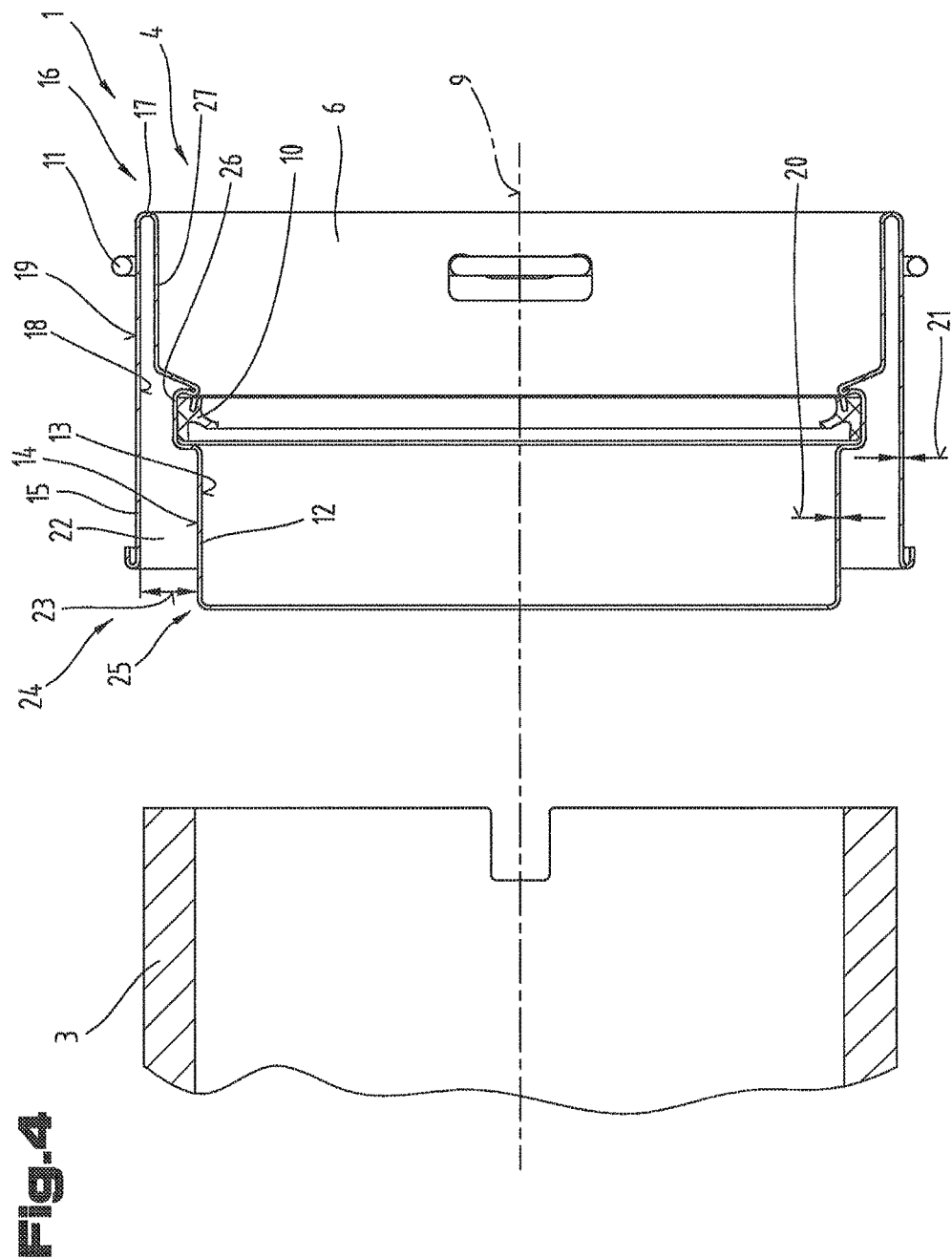
FIG. 4 shows a cross-sectional view of a second embodiments of the plug assembly in exploded view.

FIG. 4 shows an additional and possibly independent embodiment of the plug assembly 1, wherein the same reference numerals and component names have been used for the same parts as in the preceding FIG. 3. To avoid unnecessary repetition, reference is made to the detailed description of the preceding FIG. 3.

In the embodiment according to FIG. 4 the pipe 3 is made from an elastic rubber element. A sealing element 5 for sealing between the pipe 3 and connector body 6 is therefore not absolutely necessary, as a pipe 3 designed in this way can be deformed and a sealing effect can be created directly between the pipe 3 and connector body 6.

The assembly of the plug assembly 1 is described in the following with reference to the depiction in FIGS. 3 and 4.

In the embodiment according to FIG. 3 in a first method step the sealing element 5 is inserted into the annular chamber 22. When the sealing element 5 is positioned correctly in the connector body 6 the pipe 3 can be pushed into the annular chamber 22 in a further method step.

In the embodiment according to FIG. 4 preferably the pipe 3 is positioned directly in the connector body 6. The positioning of the sealing element 5 can be omitted.

In order to fix the individual components to one another, according to both embodiments the first casing section 12 is deformed plastically by a pressing process in a further method step for producing the plug assembly 1, and is pressed so that a form-fitting connection is produced between the first casing section 12 and pipe 3. The pressing method itself is explained in more detail in the description of the figures.

FIG. 5 shows a cross-sectional view of a pressing machine 28 with a clamped plug assembly 1 according to FIGS. 1 and 3, wherein here the cross-section follows the central longitudinal axis 9. In the further embodiment of the plug assembly 1 according to FIG. 4, in which a flexible pipe 3 is used, the pressing process is not explained separately in the following, as it is performed similarly to the embodiment of the plug assembly 1 according to FIG. 3.

FIG. 6 shows a perspective view of the cross-sectional representation according to FIG. 5. As shown in an overview of FIG. 5 and FIG. 6, the pressing machine 28 comprises a pressing tool 29, by means of which the first casing section 12 of the connector body 6 can be deformed and thus the pressing connection of the plug assembly 1 can be produced. The pressing tool 29 moves in radial direction 30 during the pressing process. In order to produce a tight seal between the plug connector 4 and pipe 3, a certain degree of deformation of the plug connector 4 and thus a certain travel 31 is necessary for the pressing tool 29 to move along.

For pressing a rigid pipe 3 the pressing tool 29 can have two subsections. A first subsection 32 deforms the first casing section 12 during the pressing process such that a first forming point 33 is formed. The first forming point 33 hereby produces a form-fitting connection between the pipe 3 and connector body 6. A second subsection 34 of the pressing tool 29 produces a second forming point 35 by means of which the sealing element 5 is clamped.

When pressing an elastic pipe 3 the pressing tool 29 can have only one pressing nose which deforms the first casing section 12 during the pressing process.

Furthermore, a distance measuring device 36 can be provided which through a window opening 37 in the second casing section 15 detects the outer surface 38 of the pipe 3 facing the window opening 37. In this way the deformation of the first casing section 12 can be performed depending on the result of the detection of the surface 38 of the pipe 3 performed by the distance measuring device 36.

Furthermore, it is possible that the distance measuring device 36 detects the correct position of the sealing element 5 on the first casing section 12 prior to inserting the pipe 3 into the annular chamber 22.

Furthermore, it is possible that the outer diameter of the first casing section 12 is detected by means of the distance measuring device 36. This information can be used in the pressing machine 28 for example to control the travel 31 on the basis of the measured outer diameter. Thus on measuring a larger outer diameter the travel 31 of the pressing tool 29 can also be enlarged so that the degree of pressing can be kept constant with plug assembles 1 which are slightly different due to manufacturing tolerances.

In order to detect damage to the plug connector 4 during the pressing process the force progression applied by the pressing tool 29 during the shaping process is continually monitored and evaluated.

Said evaluation of the force progression and/or the ability to identify a break in the plug connector 4 by evaluating the force progression is described in detail with reference to the diagram in FIG. 7. The x-axis of the diagram shows the travel 31 of the pressing tool 29. The y-axis of the diagram shows the pressing force 39 applied by the pressing machine 28. Furthermore, a possible force progression 40 of a good part is indicated by a dashed line and a possible force progression 41 of a part broken during the pressing process is shown by a continuous line.

FIG. 7 shows clearly that the two force progressions 40, 41 follow a similar form in principle, wherein in force progression 41 the position of the workpiece break 42 can be recognized by the drop of pressing force 39.

In order to detect such a workpiece break 42 during the pressing process the pressing force 39 is detected on the pressing tool 29. The pressing force 39 can be determined directly on the pressing tool 29 by means of a load cell. Alternatively, it is also possible for the pressing force 39 to be determined by measuring the applied force or the applied torque on the drive train. The force progression 40, 41 can be determined from the detected pressing force 39 and the travel 31 of the pressing tool 29. In particular, a pressing force increase 43 per unit of path length 44 is determined. Said determined pressing force increase 43 per unit of path length 44 is compared with a minimum required pressing force increase 43 per unit of path length 44, from which it is possible to determine a possible break of the plug connector 4.

In particular, it is assumed that there is a break in the plug connector 4 if at any time during the pressing process the detected pressing force increase 43 per unit of path length 44 is smaller than the minimum required pressing force increase 43 per unit of path length 44. If this is identified it is possible for the machine operator to tell that the plug connector 4 has broken from an acoustic and/or visual signal.

Alternatively, it is possible to remove a plug connector 4 that has been identified as a faulty by means of an automatic process.

In order to achieve a sufficiently high resolution it is possible that a value von 0.001 mm is set as the incremental value for the unit of path length 44. According to this fine resolution the increase 43 in pressing force can also be correspondingly low.

In particular, it is assumed that the force progression 40 of a good part, i.e. a non-broken plug connector 4, always has a positive gradient and that therefore the required pressing force increase 43 per unit of path length 44 has to have a positive value greater than 0 Newton.

The gradient of the force progression 40, 41 can be calculated in particular from the arctan(pressing force increase 43/unit of path length 44).

A further calculation method is based on the fact that the first derivation of the force progression 40, 41 is zero at the point at which the force progression 40, 41 has a turning point in the area of the workpiece break 42.

Furthermore, when monitoring the force progression 40, 41 a maximum force can also be monitored and it is thus possible to indicate when a force progression has been exceeded. The monitoring of the maximum force can be used in particular to establish that the intended or required degree of forming of the pressing process has been achieved. Optionally it is also possible to monitor the pressing path together with the maximum force so as to thus determine the degree of forming achieved.

The embodiments show possible embodiment variants of the plug assembly 1 and/or the monitoring of the pressing process for the production of a plug assembly 1, whereby it should be noted at this point that the invention is not restricted to the particular embodiment variants shown, but rather various different combinations of the individual embodiment variants are also possible and this variability, due to the teaching on technical procedure, lies within the ability of a person skilled in the art in this technical field.

Furthermore, also individual features or combinations of features of the various shown and described embodiments can represent in themselves independent solutions according to the invention.

The underlying problem addressed by the independent solutions of the invention can be taken from the description.

All of the details relating to value ranges in the present description are defined such that the latter include any and all part ranges, e.g. a range of 1 to 10 means that all part ranges, starting from the lower limit of 1 to the upper limit 10 are included, i.e. the whole part range beginning with a lower limit of 1 or above and ending at an upper limit of 10 or less, e.g. 1 to 1.7, or 3.2 to 8.1 or 5.5 to 10.

Finally, as a point of formality, it should be noted that for a better understanding of the structure of the plug assembly 1, the latter and its components have not been represented true to scale in part and/or have been enlarged and/or reduced in size, and also the diagram for illustrating the progression of force is only shown schematically for reasons of clarity.

LIST OF REFERENCE NUMERALS 1 plug assembly
2 mating connector
3 pipe
4 plug connector
5 sealing element
6 connector body
7 vehicle
8 turbocharger
9 longitudinal axis of the plug con nector
10 plug seal
11 spring element
12 first casing section
13 inner casing surface
14 outer casing surface
15 second casing section
16 first end section of plug connector
17 end face section
18 inner casing surface
19 outer casing surface
20 wall thickness of first casing sec tion
21 wall thickness of second casing section
22 annular chamber
23 annular chamber gap
24 second end section of plug con nector
25 pipe receiving side
26 seal mount of plug connector
27 third casing section
28 pressing machine
29 pressing tool
30 radial direction
31 travel
32 first subsection
33 first forming point
34 second subsection
35 second forming point
36 distance measuring device
37 window opening
38 surface
39 pressing force
40 force progression of good part
41 force progression of broken part
42 workpiece break
43 pressing force increase
44 unit of path length

The invention claimed is:

1. A method for connecting a pipe for liquid or gaseous media with a plug connector,
wherein a first casing section of the plug connector is deformed by means of a pressing tool in such a way that a pipe positioned between the first casing section and a second casing section of the plug connector is clamped,
wherein during the pressing process,
the pressing force applied to the pressing tool is detected and
a pressing force increase per unit of path length is calculated from the travel of the pressing tool and the pressing force;
the detected pressing force increase per unit of path length is compared to a minimum required pressing force increase per unit of path length and
in the event that the determined minimum required pressing force increase per unit of path length is not met, the plug connector is identified as faulty and
in the event that the determined minimum required pressing force increase per unit of path length is met, the plug connector is identified as a good part.

2. The method as claimed in claim 1, wherein an incremental value for a unit of path length is set to be between one ten-thousandth of a millimeter and one tenth of a millimeter, in particular a thousandth of a millimeter.

3. The method as claimed in claim 1, wherein a plug connector identified as faulty is indicated to a machine operator by means of an acoustic and/or visual signal.

4. The method as claimed in claim 1, wherein a plug connector identified as faulty is removed in an automated process.

5. The method as claimed in claim 1, wherein the increase in pressing force per unit of path length is recorded and represented graphically.

6. The method as claimed in claim 1, wherein the minimum required pressing force increase per unit of path length is set to be greater than zero Newton per unit of path length.

7. The method as claimed in claim 1, wherein the plug connector is identified as faulty when the pressing force increase per unit of path length over several unit of path lengths falls below the minimum required pressing force increase.

* * * * *